(12) United States Patent
Ryner et al.

(10) Patent No.: US 12,051,097 B2
(45) Date of Patent: Jul. 30, 2024

(54) AUTOMATED INTEGRATION SYSTEM

(71) Applicant: WALMART APOLLO, LLC, Bentonville, AR (US)

(72) Inventors: Douglas Jahe Ryner, Rogers, AR (US); David Martin Nelms, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 194 days.

(21) Appl. No.: 17/717,356

(22) Filed: Apr. 11, 2022

(65) Prior Publication Data
US 2022/0237674 A1 Jul. 28, 2022

Related U.S. Application Data

(63) Continuation of application No. 15/702,015, filed on Sep. 12, 2017.
(60) Provisional application No. 62/394,372, filed on Sep. 14, 2016.

(51) Int. Cl.
| | |
|---|---|
| *G06Q 30/0601* | (2023.01) |
| *G06F 16/27* | (2019.01) |
| *G06F 16/51* | (2019.01) |
| *G06F 16/9535* | (2019.01) |
| *G06F 16/9538* | (2019.01) |
| *G06F 16/955* | (2019.01) |
| *G06K 7/14* | (2006.01) |
| *G06K 19/06* | (2006.01) |

(52) U.S. Cl.
CPC ....... *G06Q 30/0613* (2013.01); *G06F 16/275* (2019.01); *G06F 16/51* (2019.01); *G06F 16/9535* (2019.01); *G06F 16/9538* (2019.01); *G06F 16/9554* (2019.01); *G06K 7/1417* (2013.01); *G06K 19/06037* (2013.01); *G06K 19/06112* (2013.01); *G06Q 30/0643* (2013.01); *G06F 16/27* (2019.01)

(58) Field of Classification Search
CPC G06Q 30/0613; G06Q 30/0643; G06F 16/51; G06F 16/9535; G06F 16/9554; G06F 16/27; G06K 7/1417; G06K 19/06037; G06K 19/06112
See application file for complete search history.

(56) References Cited

U.S. PATENT DOCUMENTS

| | | | |
|---|---|---|---|
| 5,642,485 | A | 6/1997 | Deaton |
| 6,129,274 | A | 10/2000 | Suzuki |
| 6,321,210 | B1 | 11/2001 | O'Brien |
| 6,580,440 | B1 | 6/2003 | Wagner |

(Continued)

OTHER PUBLICATIONS

A. Bouguettaya, B. Benatallah, L. Hendra, M. Ouzzani and J. Beard, "Supporting dynamic interactions among Web-based information sources," in IEEE Transactions on Knowledge and Data Engineering, vol. 12, No. 5, pp. 779-801, Sep.-Oct. 2000, doi: 10.1109/69.877508 (Year: 2000).*

(Continued)

*Primary Examiner* — Michelle T Kringen
(74) *Attorney, Agent, or Firm* — Fitch, Even, Tabin & Flannery LLP (57) ABSTRACT

Automated integration systems and methods using a broker system to enable the integration of a user's stored online session with a current session on a computing device in a physical facility are discussed.

20 Claims, 10 Drawing Sheets

(56) References Cited

U.S. PATENT DOCUMENTS

| | | |
|---|---|---|
| 7,195,157 B2 | 3/2007 | Swartz |
| 7,635,084 B2 | 12/2009 | Wang |
| 8,346,634 B2 | 1/2013 | Shiftan |
| 8,515,439 B2 | 8/2013 | Urie |
| 8,615,439 B2 | 12/2013 | Ramaratnam |
| 8,626,595 B2 | 1/2014 | Chung |
| 8,650,124 B2 | 2/2014 | Singh |
| 8,849,683 B2 | 9/2014 | Smith |
| 9,027,827 B2 | 5/2015 | Dessert |
| 9,152,999 B2 | 10/2015 | Argue |
| 9,330,382 B2 | 5/2016 | Argue |
| 10,937,024 B2 | 3/2021 | Ryner |
| 2002/0117544 A1 | 8/2002 | Wolf |
| 2003/0217892 A1 | 11/2003 | Persky |
| 2004/0064368 A1 | 4/2004 | Koser |
| 2008/0071614 A1 | 3/2008 | Mebruer |
| 2008/0189170 A1 | 8/2008 | Ramachandra |
| 2012/0084135 A1 | 4/2012 | Nissan |
| 2013/0085875 A1* | 4/2013 | Lamba ............... G06Q 20/3278 705/18 |
| 2013/0132854 A1 | 5/2013 | Raleigh |
| 2013/0159090 A1 | 6/2013 | Boal |
| 2013/0238456 A1 | 9/2013 | Soysa |
| 2013/0325612 A1 | 12/2013 | Sommerville |
| 2015/0154686 A1 | 6/2015 | Lawrence |
| 2015/0371254 A1 | 12/2015 | Pugh |
| 2016/0034872 A1 | 2/2016 | Hendrick |
| 2016/0210682 A1 | 7/2016 | Kannan |
| 2016/0224955 A1* | 8/2016 | Domeracki ........ G06Q 30/0635 |
| 2016/0283925 A1* | 9/2016 | Lavu .................... G06Q 20/401 |
| 2016/0371766 A1* | 12/2016 | Schmidt ............. G06Q 30/0633 |
| 2017/0024804 A1 | 1/2017 | Tepfenhart, Jr. |
| 2017/0221040 A1 | 8/2017 | Ringo |
| 2018/0075425 A1 | 3/2018 | Ryner |
| 2018/0075449 A1 | 3/2018 | Ryner |
| 2018/0075503 A1 | 3/2018 | Ryner |

OTHER PUBLICATIONS

3M TM SelfCheck QuickConnect Interface, Administrator's Guide, 2014.
NCR introduces personalization platform for self-checkout terminals, NCR, Jan. 9, 2011.
Print of sales receipts—In-app setup, Selling in person—Shopify Help Center, https://help.shopify.com/manual/sellinperson/setup/receipts, last viewed Jun. 17, 2016.
Temwork Retail, Our cloud-based retail POS System: Defining Mobility in Retail Spaces with our Cloud-Based Retail POS System, http://www.teamworkretail.com/ourcloudbasedretailpossystem/, last viewed Jun. 16, 2016.
U.S. Appl. No. 15/702,015; Office Action mailed Oct. 21, 2019.
U.S. Appl. No. 15/702,015; Office Action mailed Oct. 27, 2020.
U.S. Appl. No. 15/702,015; Office Action mailed Apr. 27, 2021.
U.S. Appl. No. 15/702,015; Office Action mailed Apr. 30, 2020.
U.S. Appl. No. 15/702,056; Office Action mailed May 14, 2020.
U.S. Appl. No. 15/702,056; Office Action mailed Oct. 23, 2021.
U.S. Appl. No. 15/702,056; Notice of Allowance mailed Feb. 3, 2021; (pp. 1-11).
U.S. Appl. No. 15/702,079; Office Action mailed May 22, 2019.
U.S. Appl. No. 15/702,079; Office Action mailed Oct. 3, 2019.
U.S. Appl. No. 15/702,079; Office Action mailed Mar. 27, 2020.
U.S. Appl. No. 15/702,079; Notice of Allowance mailed Oct. 26, 2020.
U.S. Appl. No. 15/702,056; Notice of Allowance mailed May 24, 2021; (pp. 1-12).
J.-S. Yih, F. Pinel, Y.-H. Liu and T. Chieu, "Pervasive computing technologies for retail in-store shopping," ICPS '05. Proceedings. International Conference on Pervasive Services, 2005., 2005, pp. 111-116, doi: 0.1109/PERSER.2005. 1506399 ( Year: 2005).
U.S. Appl. No. 15/702,015; Notice of Allowance and Fees Due (PTOL-85) mailed Jan. 10, 2022; (pp. 1-12).
U.S. Appl. No. 15/702,015; Notice of Allowance and Fees Due (PTOL-85) mailed Jan. 27, 2022; (pp. 1-10).

* cited by examiner

AUTOMATED INTEGRATION SYSTEM

CROSS-REFERENCE TO RELATED PATENT APPLICATIONS

This application is a continuation of U.S. application Ser. No. 15/702,015 filed on Sep. 12, 2017, now abandoned, which claims priority to U.S. Provisional Application No. 62/394,372 filed on Sep. 14, 2016, the contents of which are hereby incorporated by reference in their entireties.

BACKGROUND

Online sites have grown in popularity in recent years. As a result, many individuals that patronize physical facilities also have separate online accounts for those facilities corresponding online sites. Both the online sites and physical facilities may provide dedicated applications for an individual's mobile device.

BRIEF SUMMARY

In one embodiment, an integration system includes a first computing system, a second computing system and a broker system. The first computing system is communicatively coupled to a first database and is configured to store information associated with multiple accounts and an online session associated with at least one of the accounts. The second computing system is disposed in a facility that includes a display and a scanner and is communicatively coupled to a second database. The second database is configured to store information associated with physical objects disposed in the facility. The second computing system is configured to display on the display a graphical user interface that includes a first machine-readable element encoded with an identification of the second computing system. The broker system is communicatively coupled to the first computing system and the second computing system and is configured to establish communication with an application executing on a user's mobile device and to receive from the application executing on the user's mobile device the identification of the second computing system and a first identifier. The first identifier identifies the user of the mobile device interacting with the second computing system and the identification of the second computer system is obtained by the application executing on the mobile device reading and decoding the first machine-readable element. The broker system is further configured to, access, via the first computing system, information in the first database that is associated with the at least one of the accounts that is associated with the first identifier, retrieve via the first computing system information associated with the stored online session associated with the at least one account and to transmit a set of information from the retrieved information to the second computing system for integration into the graphical user interface being displayed by the second computing system.

In another embodiment, an integration method includes storing, via a first computing system communicatively coupled with a first database that stores information associated with multiple accounts, an online session associated with at least one of the accounts. The integration method further includes, displaying, via a second computing system that includes a display and a scanner and is communicatively coupled to a second database that stores information associated with physical objects disposed in a facility, on the display a graphical user interface that includes a first machine-readable element encoded with an identification of the second computing system. The integration method further includes, establishing, at a broker system communicatively coupled to the first computing system and the second computing system, communication with an application executing on a user's mobile device and receiving, at the broker system, from the application executing on the user's mobile device the identification of the second computing system and a first identifier. The first identifier identifies the user of the mobile device interacting with the second computing system and the identification of the second computer system obtained by the application executing on the mobile device reading and decoding the first machine-readable element. The integration method further includes, accessing, at the broker system, via the first computing system, information in the first database that is associated with the at least one of the accounts that is associated with the first identifier. The method additionally includes retrieving, at the broker system, via the first computing system information associated with the stored online session associated with the at least one account and transmitting, at the broker system, a set of information from the retrieved information to the second computing system for integration into the graphical user interface being displayed by the second computing system.

BRIEF DESCRIPTION OF DRAWINGS

The accompanying figures, which are incorporated in and constitute a part of this specification, illustrate one or more embodiments of the present invention and, together with the description, help to explain the present invention. The embodiments are illustrated by way of example and should not be construed to limit the present invention. In the figures.

DETAILED DESCRIPTION

Described in detail herein are automated integration systems and methods enabling the integration of a user's stored online session with a current session on a computing device in a physical facility. In one embodiment, an account holder can launch a mobile application on their mobile device and generate a machine-readable element encoded with an identifier associated with an online account of the account holder. The account can be tied to a first computing system.

The account holder can scan the machine-readable element at a second computing system in the physical facility using a provided scanner. The second computing system can decode the machine-readable element to access the identifier. The identifier is transmitted to a broker system which uses the identifier to retrieve information regarding a stored online session associated with the user account from a first database associated with the first computing system. The retrieved information is transmitted to the second computing system and integrated into a displayed graphical user interface on the second computing system displaying information regarding a current session for the user.

Figure 1A:
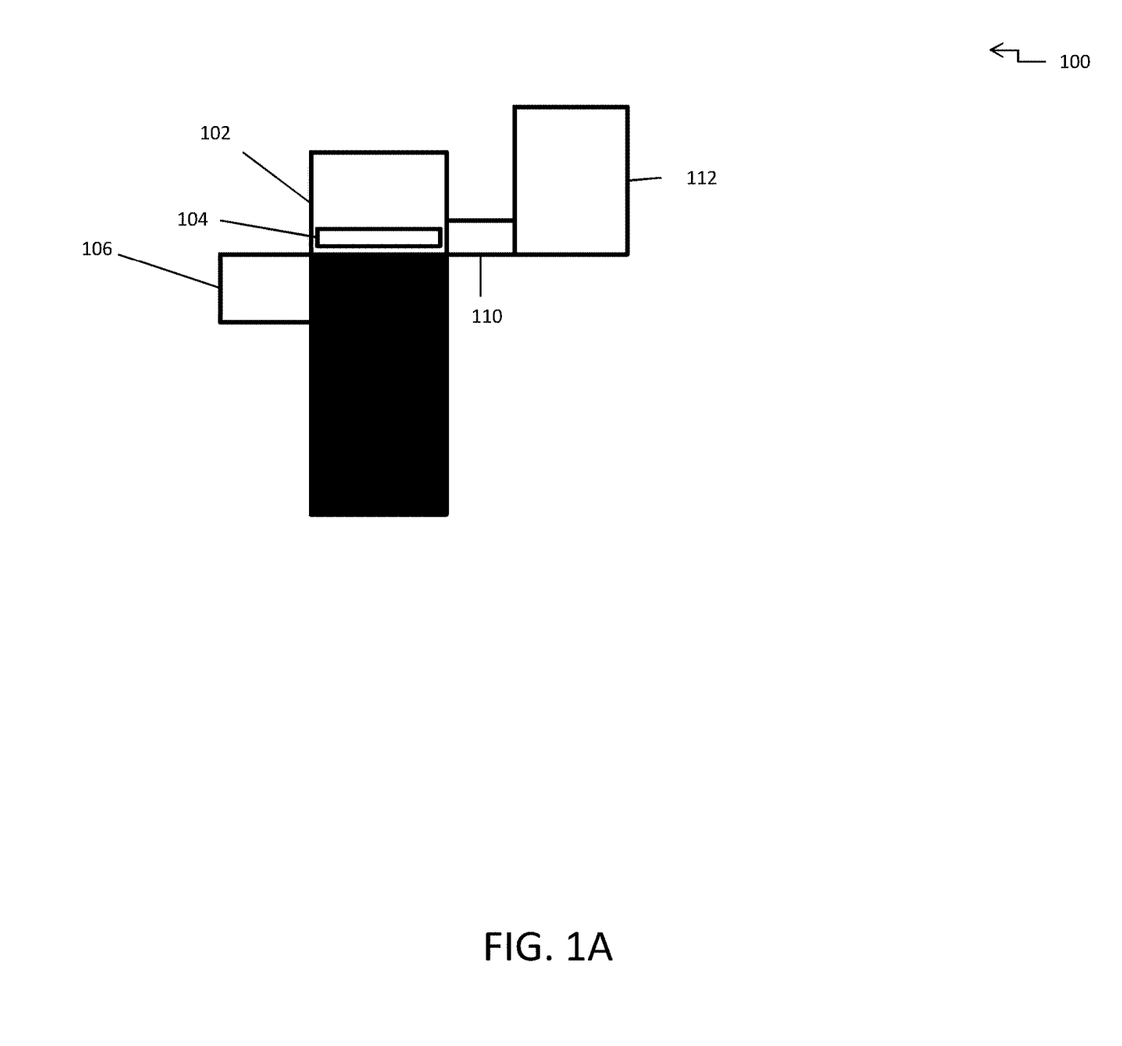
FIG. 1A is a block diagram of a second computing system configured to be integrated with a first computing system in accordance with an exemplary embodiment.

FIG. 1A is a block diagram of a second computing system configured to be integrated with a first computing system in an exemplary embodiment. The second computing system 100 can be disposed in a physical facility. Physical objects can also be disposed in the facility. In one embodiment, the physical facility is a retail facility, the second computing system is a Point of Sale (POS) register including a cash drawer and transaction receipt roll and the physical objects are items for sale. The second computing system 100 can include a display 102, a reader 110, a scanner 104, a scale 106, and a printer 112.

In one embodiment, the second computing system 100 can be configured to integrate a current session of a user interacting with the second computing system with stored account information from a first computing system that includes a stored online session for the user via an intervening broker system. The scanner 104 can be an optical scanner configured to read and decode machine-readable elements. The machine-readable elements can be barcodes, QR codes, RFID tags, or types of machine-readable elements detectable by Near Field Communication Devices (NFC). The machine-readable elements can be encoded with an identifier. The identifiers decoded from machine readable elements can be associated with physical objects disposed at the facility or identify an account of a user. The display 102 can be configured to display information associated with the physical objects and/or information associated with the at least one online account of the user. The reader 110 can be configured to read and decode information in magnetic card strips or a card chip. The printer 112 can be configured to print information associated with the displayed information. The scale 106 can be an electronic weighing machine configured to determine a weight of an object placed on the scale.

Figure 1B:
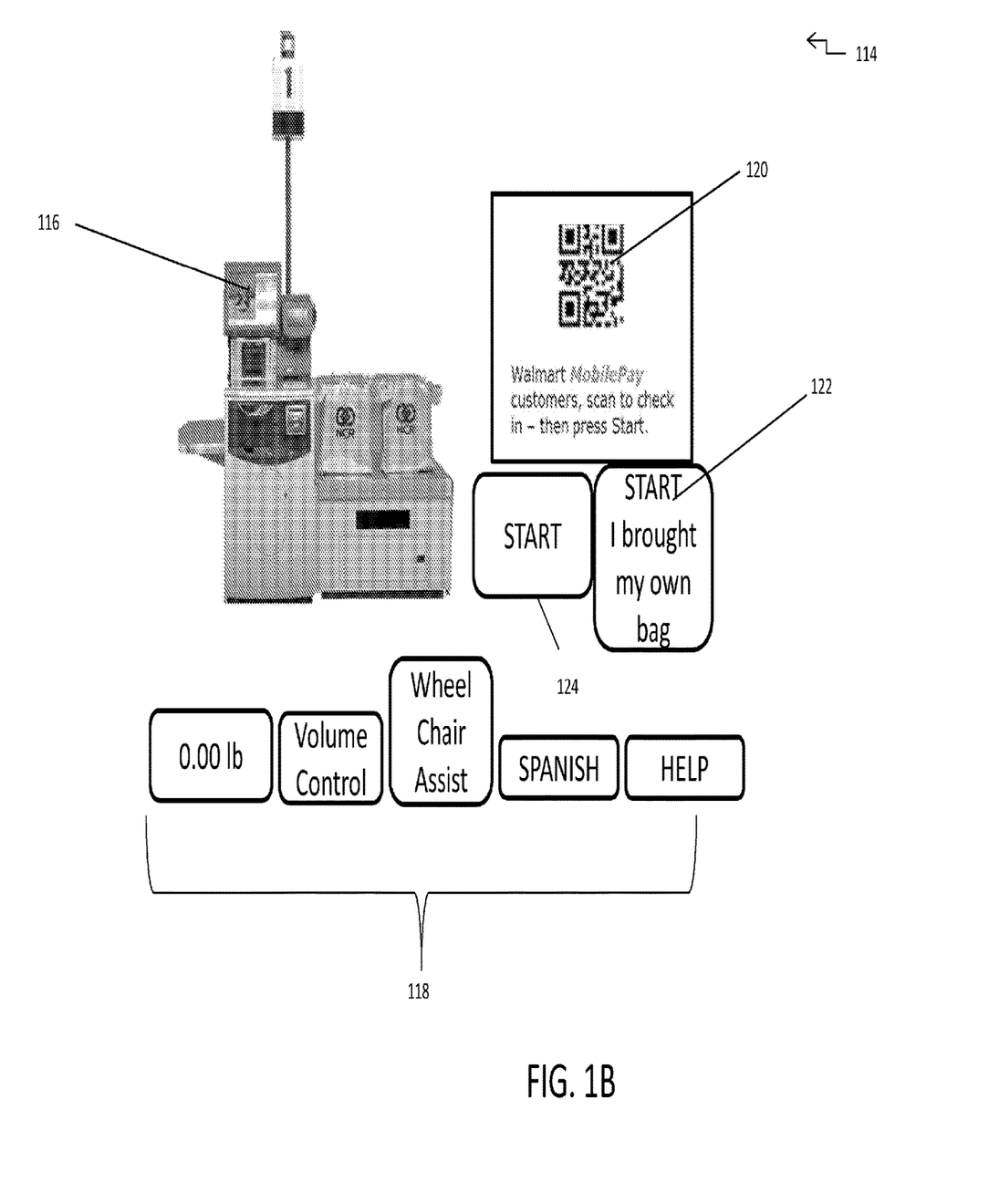
FIG. 1B is a view of an interactive graphical user interface before integration in accordance with an exemplary embodiment.
Figure 1C:
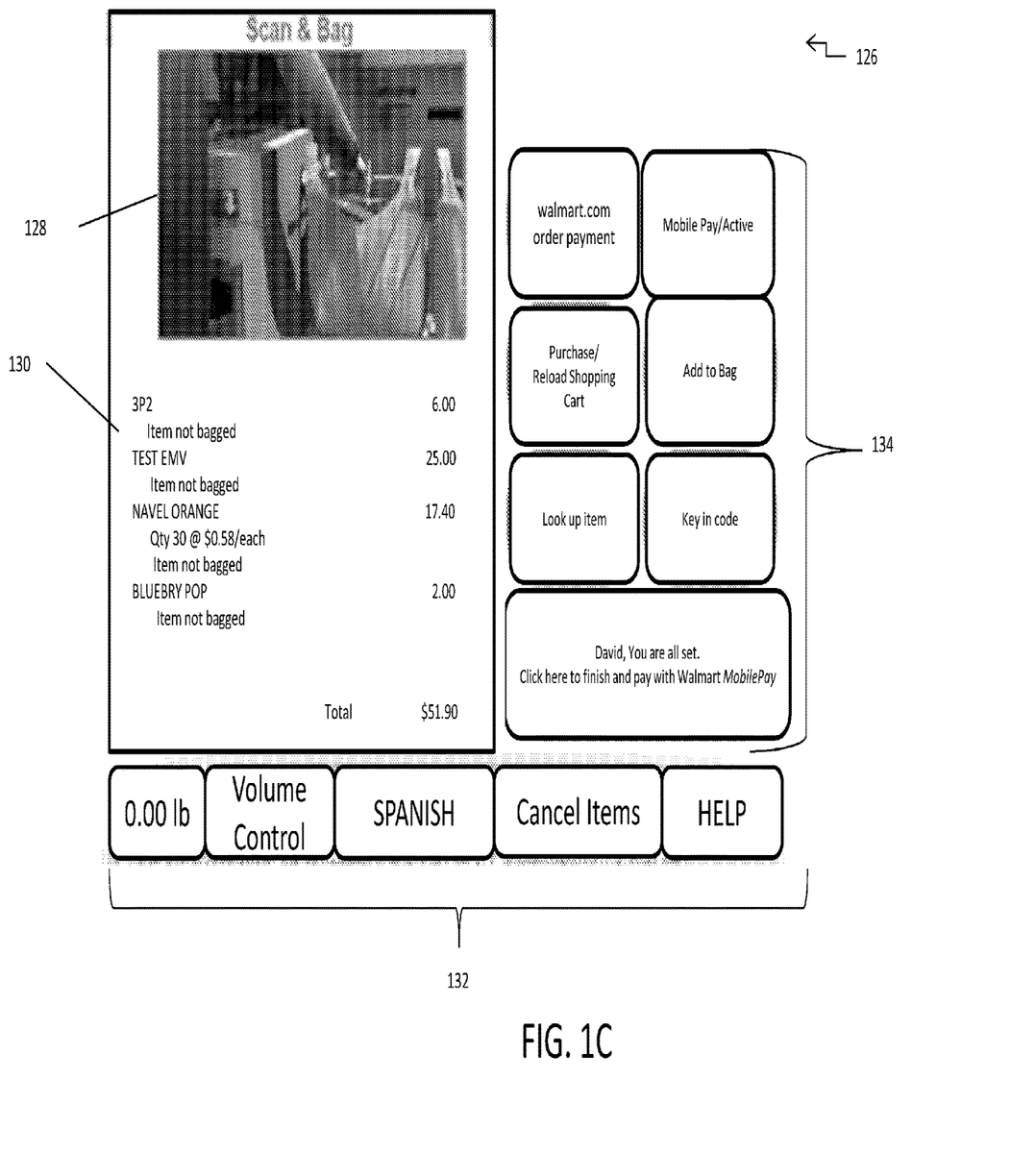
FIG. 1C is a view of the interactive interface after integration in accordance with an exemplary embodiment.

FIG. 1B is a view of an interactive graphical user interface before integration in accordance with an exemplary embodiment. In an exemplary embodiment, a second computing system (e.g. second computing system 100 as shown in FIG. 1A) can display an interactive graphical user interface 114 on the display (e.g. display 102 as shown in FIG. 1A). The interface 114 can include an instructional image 116, interface customization options 118 such as volume control, accessibility for the physically disabled, language options and a selection for "Help" if assistance is needed. Furthermore, interface 114 can also include a display of a weight of an object put on the scale (as shown in FIG. 1A). A user may interact with the display to begin a current session. For example, the user may scan products for sale at the facility at the second computing system as part of a self-checkout with the display displaying relevant details about purchases. The user may also interact with the second computing system 100 to integrate information from an online account, including a stored online session, into the interface 114.

In one embodiment, the user can initiate the integration through the use of a machine-readable element 120 such as a barcode or a QR code displayed on interface 114. The machine-readable element 120 can be encoded with an identifier of the second computing system 100. In exemplary embodiments, the machine-readable element 120 can be scanned by an application executing on a mobile device of a user interacting with the second computing system. An identifier of the second computing system decoded from the machine readable element can be sent to a broker system by the user's mobile phone along with an identifier of the user for an online account of the user. In one embodiment, the broker system may include a server supporting operation of the mobile application executing on the user's mobile device and may be operated by an entity also associated with the physical facility. The broker system can establish communication with the application executing on the user's mobile device and receive the identification of the second computing system and the identifier identifying the user of the mobile device interacting with the second computing system.

In another embodiment, the user may display a machine-readable element on the display of their mobile device which may be read and decoded through the use of the scanner at the second computing system. The scanner may decode an identifier of an online account for the user. The second computing system may send the identifier for the user's online account (and an identifier indicating the identity of the second computing system) to the broker system, either directly or by returning both identifiers to the user's mobile device for transmission to the broker system.

It will be appreciated that other mechanisms for pairing the second computing system and the user's mobile device besides the scanning and reading mechanisms described herein may be conducted in order to provide the second computing system identification and the user identifier to the broker system and are within the scope of the present invention.

Regardless of the mechanism of transmittal, upon receiving the identifier of the user's online account, the broker system may use the identifier of the user's online account to access a first computing system communicatively coupled to a database holding information for multiple user accounts. In one embodiment, the first computing system can be an online store associated with the entity controlling the broker system and the physical facility. The broker system may retrieve information associated with the user including information from a previously stored online session that includes details of an incomplete transaction. The broker system transmits the retrieved information to the second computing system for integration into the displayed graphical user interface 114 displaying the current session details with the user.

FIG. 1C-G are views of exemplary interactive graphical user interfaces after integration in accordance with exemplary embodiments. The second computing system can be configured to integrate account holder information associated with an account tied to a virtual retail store or other online site (e.g. the first computing system) on the graphical user interface of the display of the second computing system. Furthermore, the second computing system can be used to complete transactions associated with items saved in a saved online session. The second computing system can include the interface 126 on the display (e.g. display 102 as shown in FIG. 1A). The interface 126 can include an instructional image 128, information for a current session with a user including information associated with scanned items such as grocery items 130 from the physical facility and interface customization options 118 such as volume control, accessibility for the physically disabled, language options and a selection for "Help" if assistance is needed. The information associated with scanned items 130 can include but is not limited to: a name of the physical object (e.g. "orange"), a brand of the physical object, a quantity of the items scanned, and the price of each physical object. The information associated with the scanned items 130 can also include a total amount due. The interface 126 can include selection buttons 134. The selection buttons 134 can be displayed after the second computing system is integrated with online account information stored by the first computing system. The account holder information can be accessed by through the interface of the second computing system after the integration of the online information into the displayed graphical user interface. The selection buttons 134 can include selections specific to the integrated online account. For example, selection buttons 134 can include, but are not limited to, a mobile pay selection associated with the integrated online account, a selection option to complete an order associated with the integrated online account and a selection to purchase or reload a shopping card associated with the integrated account. The selection button 134 can also include selection buttons for looking up a physical object and a button to allow a user to key in a code and/or an identifier associated with a physical object manually.

Figure 1D:
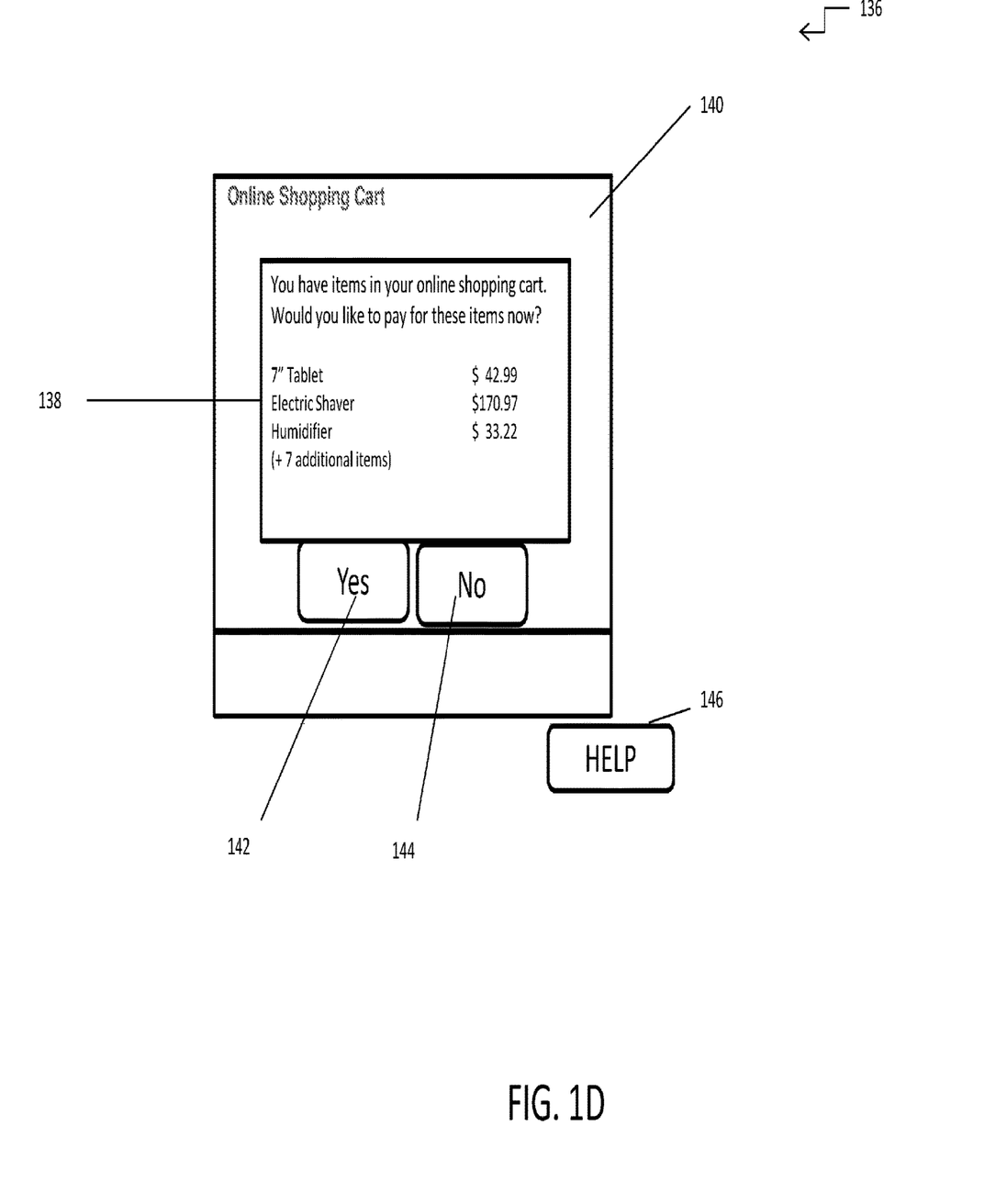
FIG. 1D is a view of the interactive interface after integration in accordance with an exemplary embodiment.

In an exemplary embodiment depicted in FIG. 1D, the interface 136 can be displayed on the display (e.g. display 102 as shown in FIG. 1A) of the second computing system (e.g. second computing system 100 as shown in FIG. 1A) after the integration of the account information associated with the user that is stored in the first computing system. The account information stored by the first computing system may include a stored online session in which the user may have initiated an order of items, but did not complete the transaction. The account holder of the account may have placed items 138 in a virtual/online shopping cart 140. The first computing system can save the virtual/online shopping cart 140 and the items 138 inside the virtual/online shopping cart 140. By integrating the online account information stored in by the first computing system with in the information for the session currently executing on the second computing system, the display of the second computing system can display the online/virtual cart 140 stored at the first computing system. The account holder can choose to complete the transaction started on the virtual retail store at the second computing system, by selecting the "yes" 142 or "no" 144 buttons. The account holder can also select a "Help" button 146 if assistance is needed.

Figure 1E:
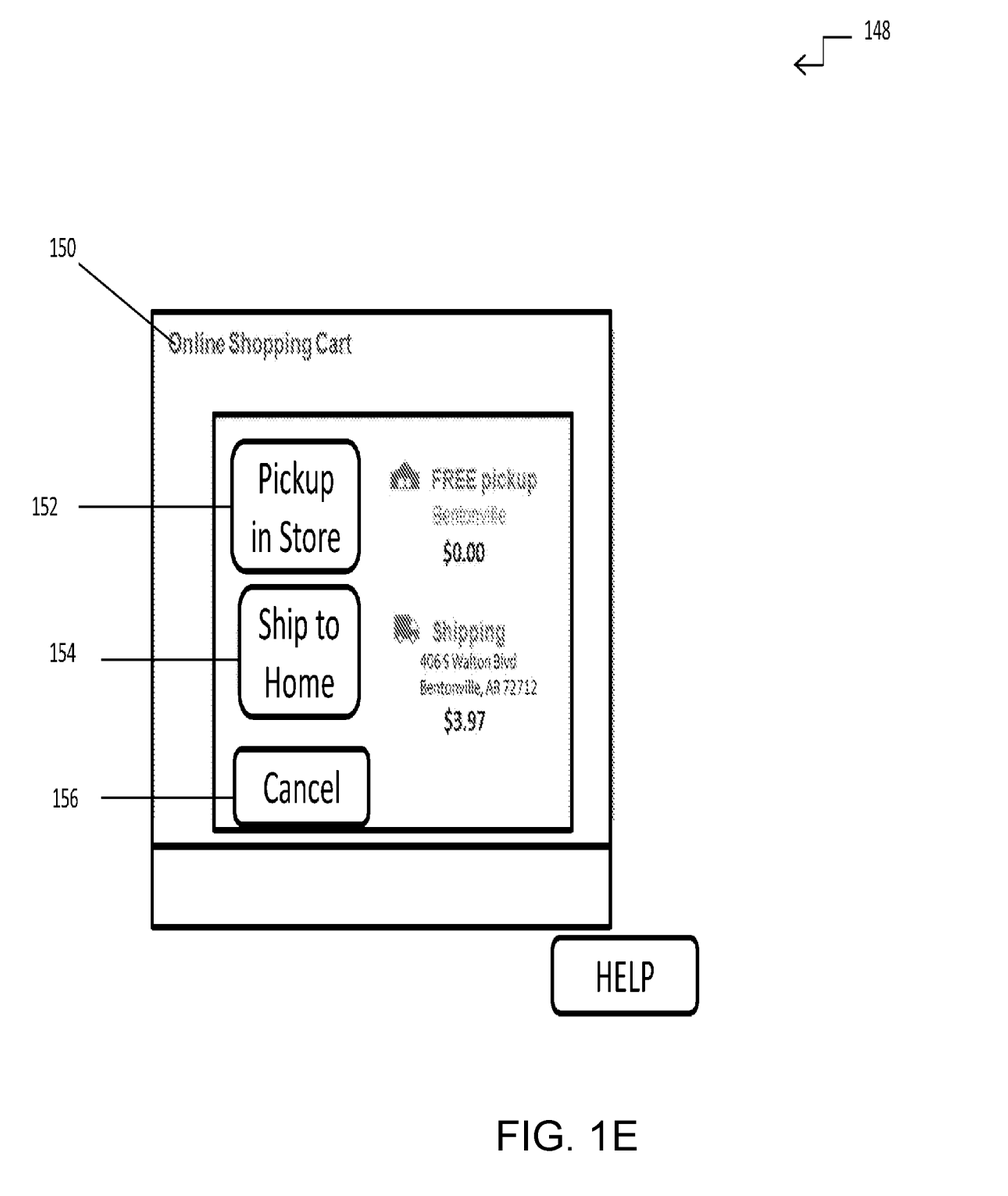
FIG. 1E is a view of the interactive interface after integration in accordance with an exemplary embodiment.

In an exemplary embodiment depicted in FIG. 1E, in response to the account holder choosing to complete the transaction initiated at the first computing system's online site by using the second computing system, the interface 148 can provide pickup and delivery options for the account holder. For example, the second computing system can consult a second database with which it is communicatively coupled that stores records of products available in the facility and determine that the items purchased from the online site are in the physical facility where the second computing system is located. The second computing system can provide an option in the rendering of the virtual/online shopping cart 150 to pick up the items in the retail store by selecting the "pickup in store" selection button 152. Alternatively, the second computing system can determine the items are not in the physical facility in which the second computing system is located and the second computing system can determine the closest facility at which the items are available for pickup by consulting the second or another database holding inventory information for other facilities. In another example, the second computing system can list the retrieved stored address of the account holder (retrieved by the broker system from the account information stored by the first computing system) and provide an option for the items to be delivered at the address of the account holder by selecting "Ship to Home" button 154. In one embodiment, the account holder can cancel out of the transaction by selecting a "Cancel" button 156 or selecting a "Help" button 158 if assistance is needed.

Figure 1F:
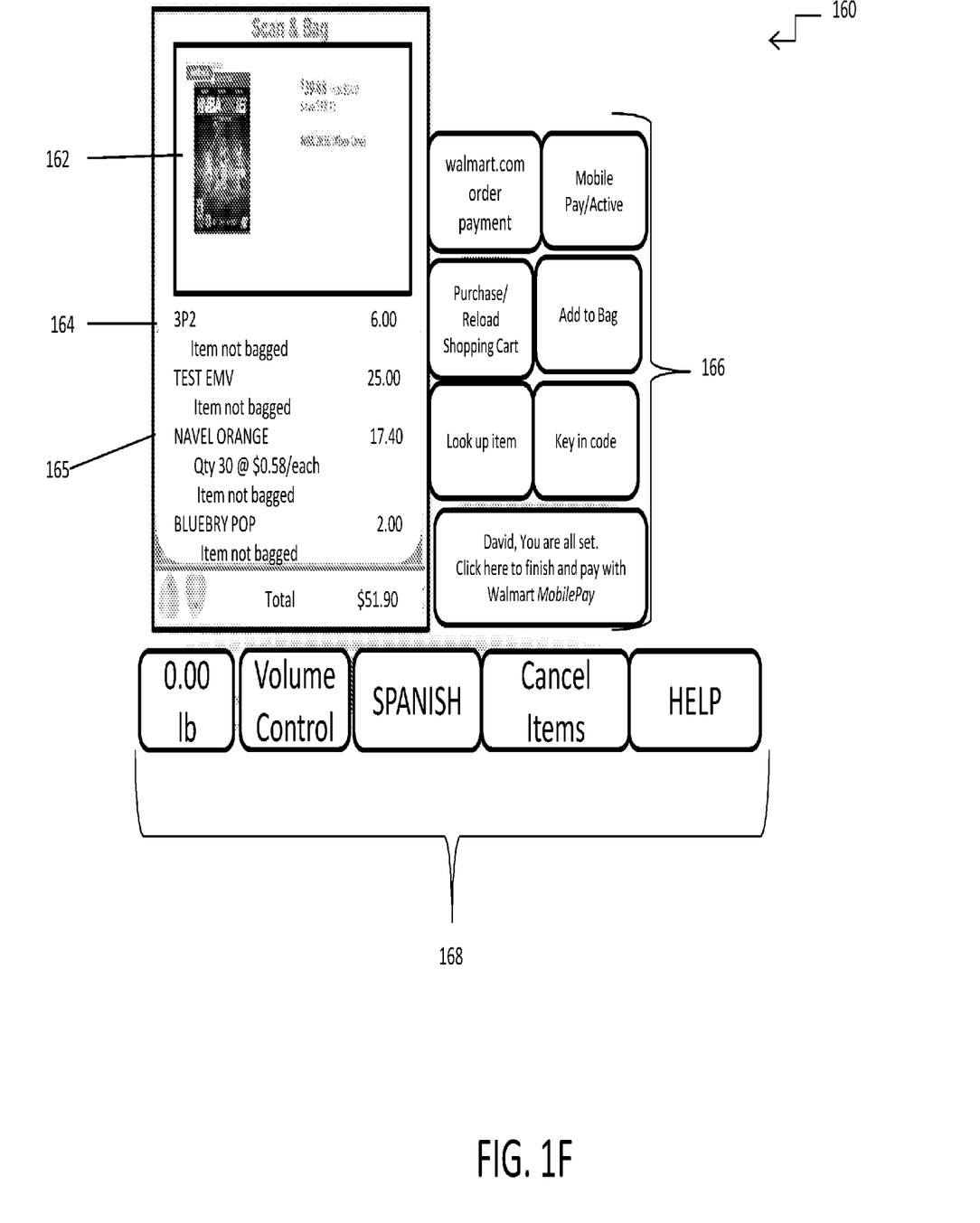
FIG. 1F is a view of the interactive interface after integration in accordance with an exemplary embodiment.

In an exemplary embodiment depicted in FIG. 1F, the second computing system may display an image of a physical object or item that was selected for purchase in a stored online session. For example, the account holder can make a selection to complete a transaction regarding a physical object or item in a virtual shopping cart from the stored online session using the second computing system at the physical retail store. The second computing system may display an image 162 of the items in the virtual shopping cart retrieved via the broker system. In one embodiment, the second computing system can automatically modify the size of the image 162 and display the image 162 of the physical object or item on the interface 160. The interface 162 can also display information such as price and quantity of the physical object or item. The interface 164 can also provide an option to add a recommended physical object or item to the shopping cart based on information regarding the user's online shopping history stored by and retrieved from the first computing system. In one embodiment the account holder can add the recommended physical object or item to the shopping cart by selecting the "Add to Cart" button 165. The interface 160 can include information associated with scanned physical objects 164 and interface customization options 168 such as volume control, accessibility for the physically disabled, language options and a selection for "Help" if assistance is needed. The selection buttons 166 can include selections specific to the integrated online account. For example, selection buttons 166 can include a mobile pay selection stored by the integrated online account, a selection option to complete an order started but not completed in a stored online session, and a selection to purchase or reload a shopping card associated with the integrated online account. The selection button 166 can also include look up buttons for looking up a physical object and a "key in" button to enter a code and/or an identifier associated with a physical object manually.

Figure 1G:
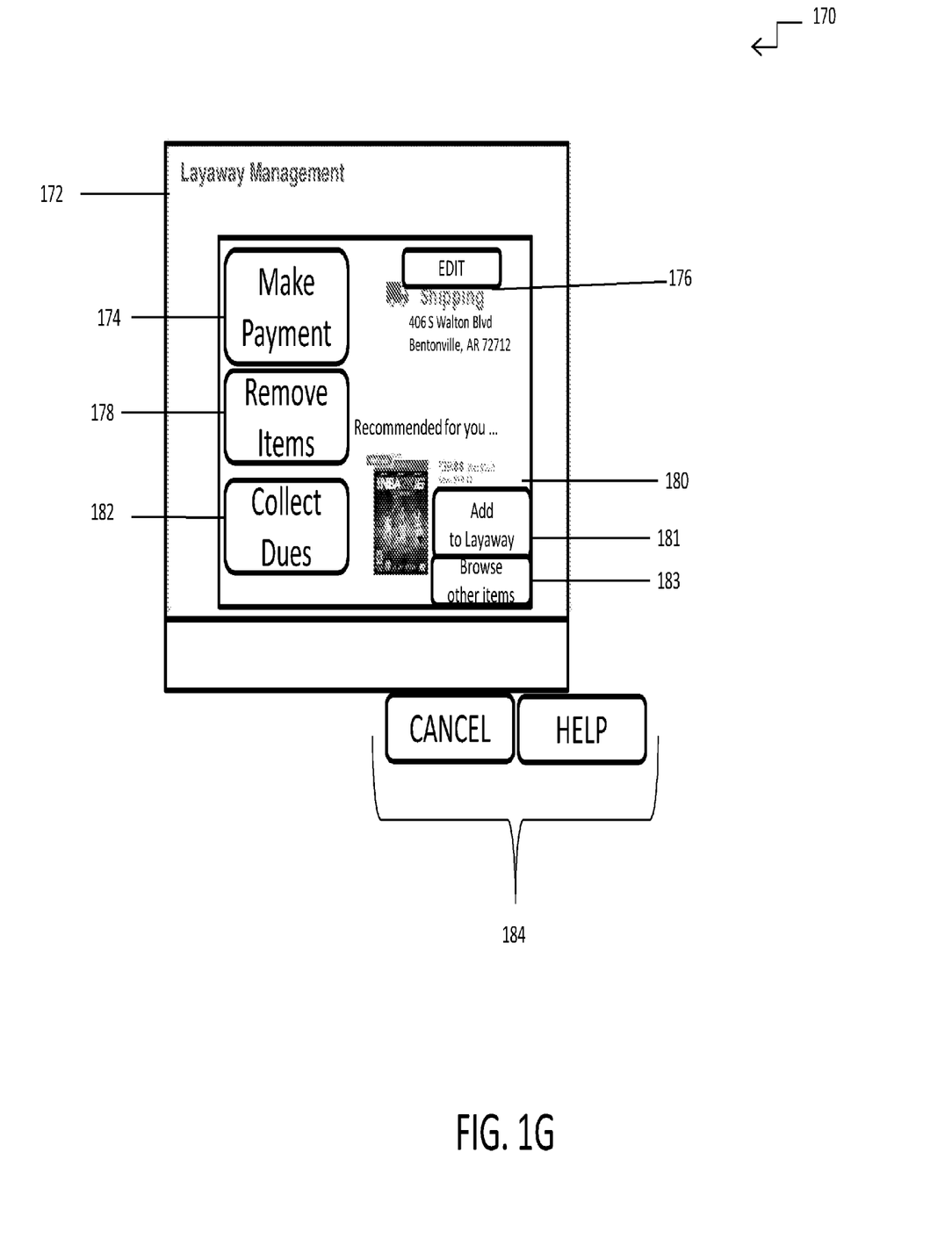
FIG. 1G is a view of the interactive interface after integration in accordance with an exemplary embodiment.

In an exemplary embodiment depicted in FIG. 1G, the second computing system can also provide layaway management 172 on the interface 170. The second computing system can integrate the user's information from the first computing system including information regarding any layaway items from the online account and the physical retail store. In one embodiment the user can make payment for a layaway item from the virtual retail store at the second computing system by selecting a "Make Payment" button 174. The account holder can further remove items from layaway from the virtual retail store at the second computing system by selecting a "Remove Items" button 178. The account holder can also collect any funds due for the layaway items from the online site at the second computing system by selecting a "Collect funds due" button 182. Furthermore, the account holder can select the option to have the layaway item shipped to an address 176.

The second computing system can also recommend items to the user for layaway based on the user's transaction history at the online site and at the physical facility. In one embodiment the second computing system can resize and display an image 180 of the recommended physical object or items along with the associated information. The user/account holder can add the recommended physical object or item to layaway by selecting a displayed "Add to layaway" button 181. Alternatively, the user/account holder can select a "Browse other items" button 183. The account holder can browse items available at the physical retail store and the online site supported by the first computing system in response to selecting the "Browse other items" button 183. In one embodiment, the account holder can cancel out or ask for assistance of the layaway management 172 interface by selecting the "Cancel" or "Help" buttons 184.

Figure 2:
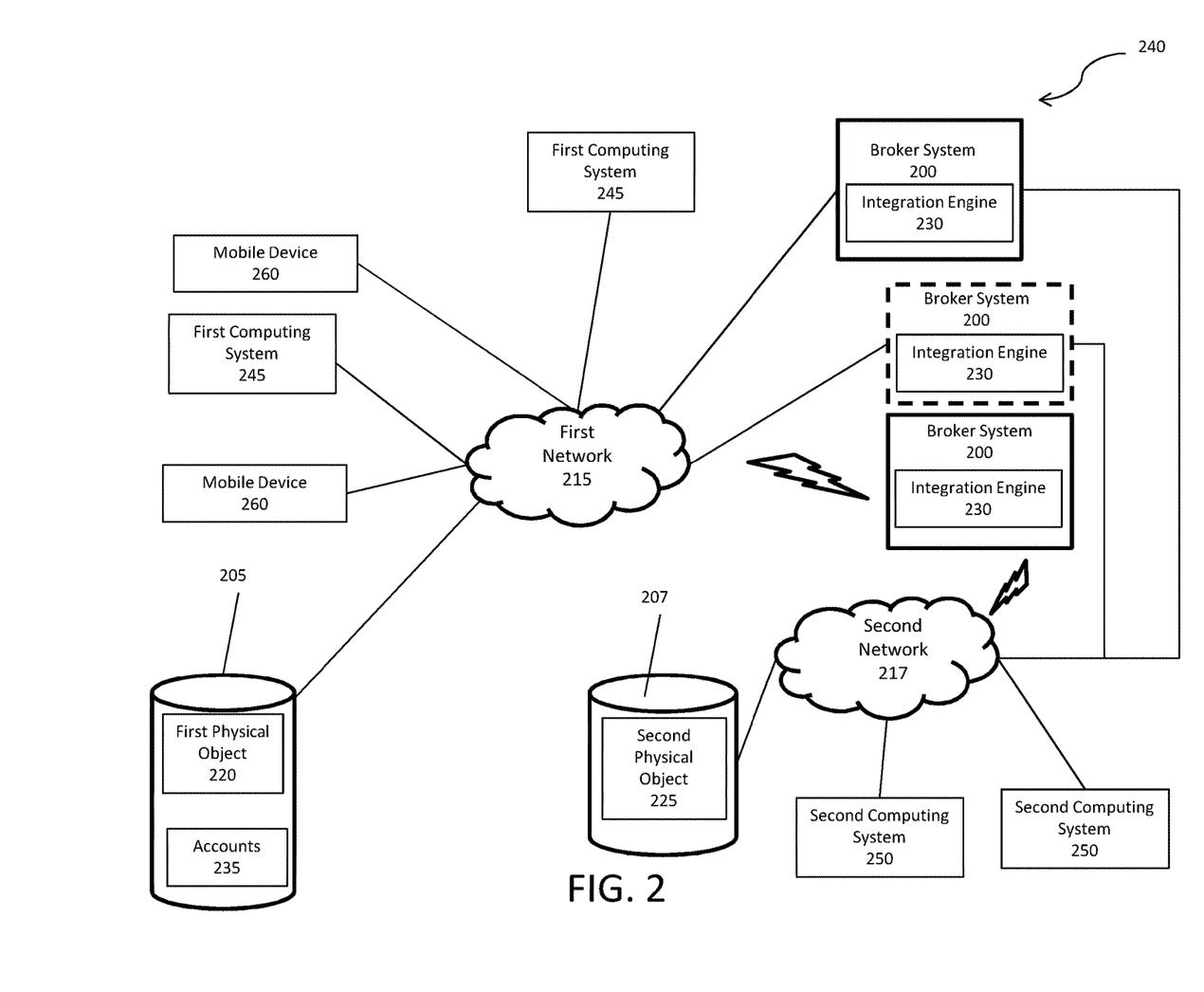
FIG. 2 is a network diagram of the automated integration system according to an exemplary embodiment.

FIG. 2 illustrates an exemplary automated integration system in accordance with an exemplary embodiment. The automated integration system 240 can include a first database 205, a second database 207, one or more of first computing systems 245, one or more instances of the broker systems 200, one or more of the second computing systems 250 and one or more mobile devices 260. In one exemplary embodiment, the first computing system 245 can be in communication with the first database(s) 205, the mobile devices 260, and the broker systems 200, via a first communications network 215. The second computing system 250 can be in communication with the second database(s) 207, and the broker systems 200, via second communication network 217. The broker system 200 can implement at least one instance of an integration engine 230.

In an example embodiment, one or more portions of the first and second communications network 215, 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The first computing system 245 may include one or more computers or processors configured to communicate with the broker system 200 and the first databases 205, via the first network 215. The first computing system may hosts one or more applications configured to interact with one or more components of the broker system 200 and/or facilitates access to the content of the databases 205. The second computing system 250 includes one or more computers or processors configured to communicate with the broker system 200 and the second databases 207, via the first network 217. The second computing system 250 hosts one or more applications configured to interact with one or more components of the broker system 200 and/or facilitates access to the content of the databases 207. In some embodiments, the first or second computing systems 245, 250 can host the integration engine 230 or portions thereof. The first databases 205 may store information/data, as described herein. For example, the first databases 205 can include first physical objects database 220 and an accounts database 235. The first physical objects database 220 can store information associated with physical objects disposed at various facilities and/or available through an online site provided by the first computing system 245. The accounts database 235 can store account holder information and sessions of the account holders with the first computing system 245. The first databases 205 can be located at one or more geographically distributed locations from each other or from the first computing system 245. Alternatively, the first databases 205 can be included within in a computer or processing device of the first computing system. The second databases 207 may store information/data, as described herein. For example, the second databases 207 can include second physical objects database 225. The second physical objects database 225 can store information associated with physical objects disposed at a particular facility. In some embodiments, the first physical objects database 220 can store information associated with physical objects disposed at the facility in which the second computing system 250 is disposed. The second databases 207 can be located at one or more geographically distributed locations from each other or from the second computing system 250. Alternatively, the second databases 207 can be included within a computer or processing device of the second computing system 250

In exemplary embodiments, the first computing system 245 can be an online site such as a virtual retail store and the second computing system 250 can be a POS terminal in a retail facility. The second computing system can include a display with an interactive graphical user interface as described herein. An online account holder can launch an application associated with the online site provided by the first computing system 245 on a mobile device 260. The mobile device 260 can display a machine-readable element encoded with an identifier associated with the account holder. The account holder can scan the machine-readable element at the second computing system using a scanner. The machine-readable element can be a barcode or a QR code.

The broker system can execute an integration engine 230. The integration engine 230 can establish communication with an application executing on the mobile device 260 and receive the identification of the second computing system 250 and an identifier identifying the user of the mobile device interacting with the second computing system 250. The identification of the second computing system may be obtained by the application executing on the mobile device reading and decoding the first machine-readable element displayed in the graphical user interface of the second computing system. The integration engine 230 can use the identifier identifying the user's online account to retrieve account holder information associated with the identifier from a database associated with the first computing system. The account holder information can be tied to an account in the online site provided by the first computing system 245. The account holder information can include name of account holder, payment methods including Mobile Pay accounts, addresses, transaction history and a stored online session. The integration engine 230 can integrate the stored online session of the account holder with the graphical user interface of the display of the second computing system 250.

Subsequent to the integration of the stored online session and other retrieved information of the account holder with the graphical user interface of the display of the second computing system 250, the second computing system 250 has access to all of the account holder's information tied to the first computing system. For example, the second computing system 250 can display and access all of the account holder's payment methods stored with the first computing system. For example, the second computing system can display and access the account holder's credit/debit card payment methods, gift card payment methods and mobile payment methods. Accordingly, the account holder/user can complete a transaction at the second computing system using a stored payment method associated with an online account rather than using a physical debit/credit/gift card or cash.

In another example, the stored online session can include a virtual/online shopping cart with items stored within the virtual shopping cart. The second computing system 250 can display the virtual/online shopping cart on the display. The account holder can complete the transaction related to the items in the virtual/online shopping cart at second computing system. The second computing system can query the second physical objects database 225 to verify whether the items in the virtual shopping cart are present at the physical facility in response to the account holder selecting to complete the incomplete stored transaction. In the event an item is not present in the facility in which the second computing system is located, the integration engine 230 can query the first physical objects database 220 using and identifier associated with the item, to retrieve a list of the locations where the item is available. The integration engine 230 can display at the second computing system 250 the locations where the item is available for pickup. Alternatively, the option of delivery to the account holder's address can be displayed on the second computing system 250.

In another example, the integration engine 230 can access the transaction history of the account holder from the online account and the transactions from the current session at the physical facility at the second computing system 250. Based on the transaction history from the online account and the transactions completed in the current session at the second computing system 250 the integration engine can query the first and second physical objects databases 220 and 225 to retrieve a list of recommended items available at the physical facility where the second computing system 250 is located or any other retail store. As a non-limiting example, the account holder can scan a machine-readable element encoded with a identifier associated with a sports related video game at the second computing system 250. The integration engine 230 can determine the account holder has purchased several sports related video games through his or her online account and in response can query the first and second physical objects databases 220 and 225 for any sports related video games available at the physical facility in which the second computing system 250 is located. The integration engine 230 can also seek to determine sports related video games available for pickup at any other retail store location and/or that are available to be delivered to the account holder's address. The integration engine 230 can display the available options for the account holder at the second computing system 250 through the displayed graphical user interface.

In yet another example, the integration engine 230 can access layaway items held by the account holder in the online account. The integration engine 230 can present the option of purchasing the layaway items from the account holders online account at the second computing system 250. The account holder can remove the items from list of layaway items or chose to collect funds due based on the layaway items at the second computing system 250. In response to the account holder selecting to purchase a layaway item, the integration engine 230 can query the second physical objects database 225 to determine if the layaway item is present at the physical facility in which the second computing system 250 is located. In response to the layaway item being present at the physical facility, the integration engine 230 can present on the graphical user interface provided by the second computing system 250, the option to pick up the layaway item at the store. Otherwise, the integration engine 230 can present the option on the graphical user interface provided by the second computing system 250 to have the layaway item delivered to the account holder's address. The integration engine 230 can also recommend, via the graphical user interface provided by the second computing system 250, products available at the physical facility in which the second computing system is located, and/or products available at other retail store locations or available for delivery by querying the first and second physical objects databases 220, 225. The integration engine 230 can also present an option via the graphical user interface provided by the second computing system 250 for a user to browse items available in the physical facility in which the second computing system 250 is located and otherwise.

Figure 3:
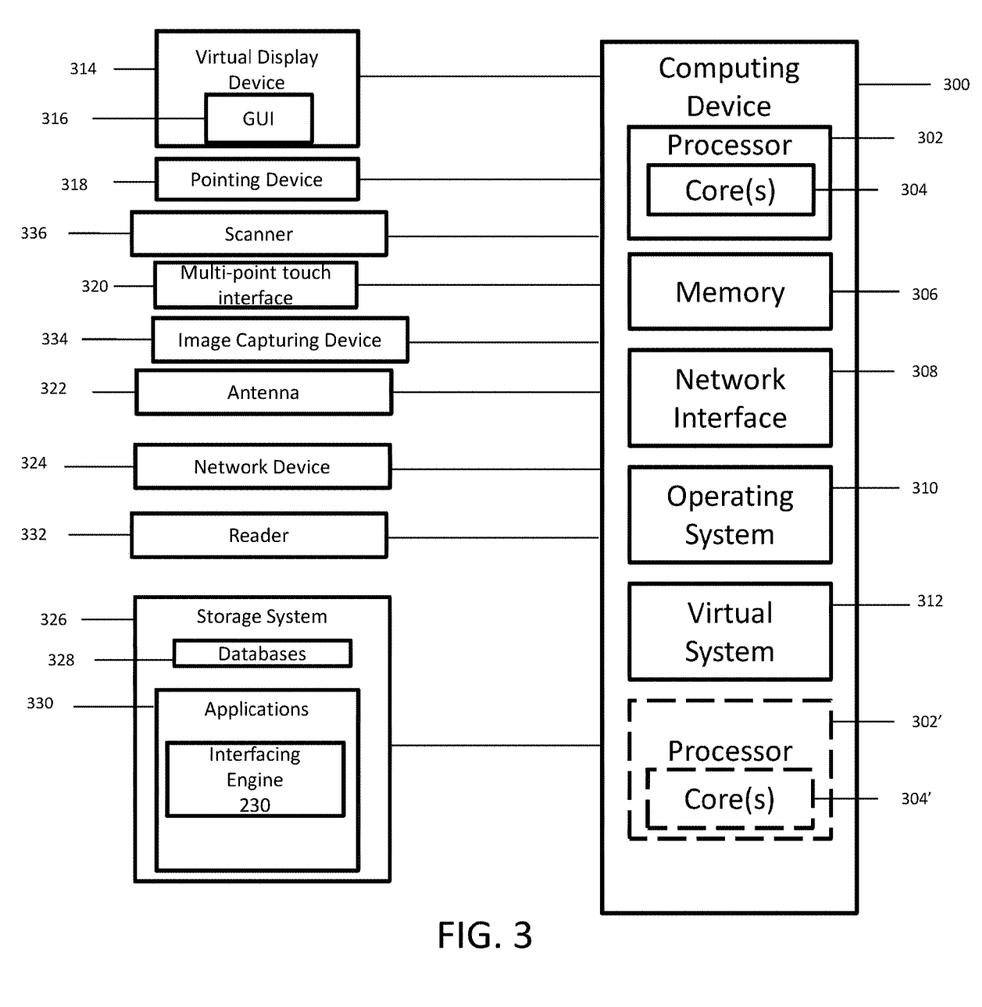
FIG. 3 is a block diagrams illustrating of an exemplary computing device in accordance with an exemplary embodiment.

FIG. 3 is a block diagram of an example computing device for implementing exemplary embodiments of the present disclosure. Embodiments of the computing device 300 can implement embodiments of the integration engine, the mobile device, and the first and second computing systems. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the integration engine 230) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an scanner 336 and a reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding available physical objects and account holder information. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
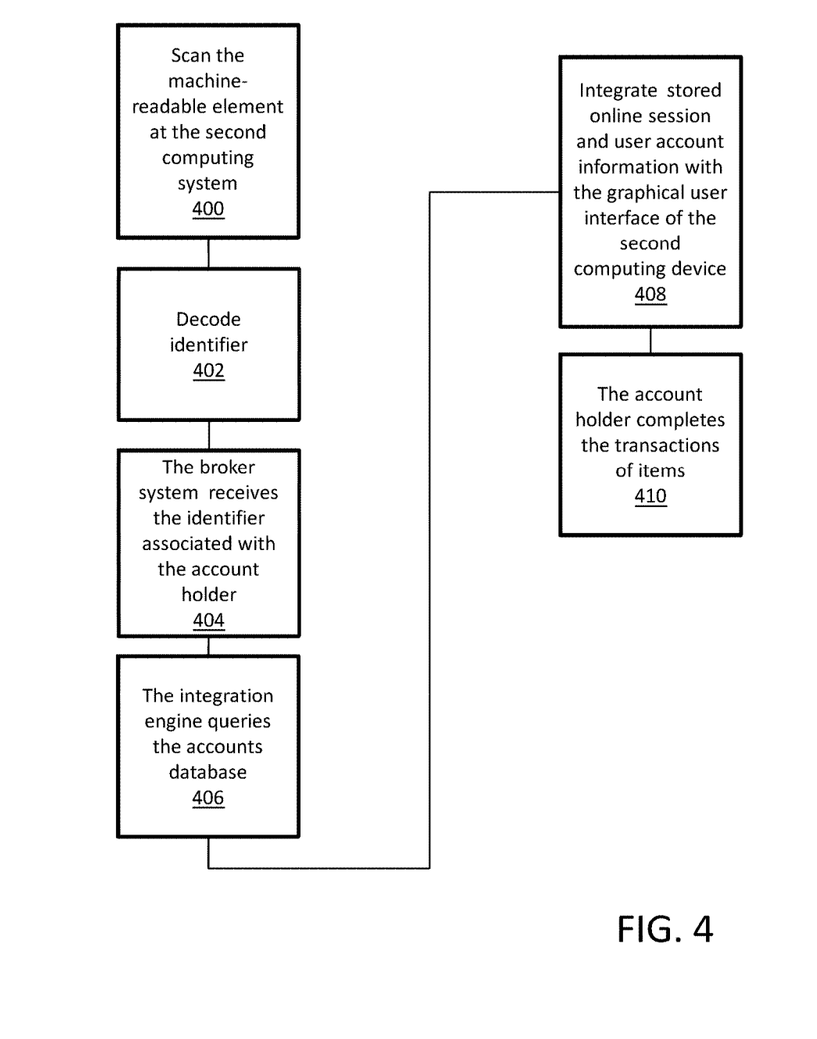
FIG. 4 is a flowchart illustrating an exemplary process in accordance with an exemplary embodiment.

FIG. 4 is a flowchart illustrating the process for the automated integration system according to exemplary embodiments of the present disclosure. In operation 400, an account holder launches a mobile application on their mobile device which generates a machine-readable element (e.g. machine-readable element 120 as shown in FIG. 1B) encoded with an identifier associated with the account of the account holder. The account can be tied to the first computing system (e.g. first computing system 245 as shown in FIG. 2). The account holder can scan the machine-readable element at the second computing system (e.g. second computing system 100 and 250 as shown in FIGS. 1A and 2) using a scanner (e.g. scanner 104 as shown in FIG. 1A).

In operation 402, the scanner of the second computing system decodes the identifier from the machine-readable element. The identifier is associated with the user's online account. The second computing system can transmit (either directly or indirectly) the identifier associated with the account of an account holder to a broker system (e.g. broker system 200 as shown in FIG. 2) In alternative embodiment, the second computing system can generate and display the machine-readable element. The mobile device can launch an application of the first computing system and scan and decode the identifier of the second computing system. The first computing system can transmit an identifier associated with the account of the account holder and an identifier associated with the second computing system to a broker system. In operation 404, the broker system can receive the identifier associated with the account of the account holder and execute the integration engine (e.g. integration engine 230 as shown in FIG. 2). In operation 406, the integration engine can query the accounts database (e.g. accounts database 235 as shown in FIG. 2) using the identifier to retrieve the associated account holder information. The account holder information can include but is not limited to: a name of account holder, a payment methods, addresses, a transaction history and a stored online session.

In operation 408, the integration engine can integrate the stored online session with the graphical user interface of the second computing system. The stored online session can include a virtual shopping cart. The virtual shopping cart can include items from an online site placed there by the account holder. The integration can determine whether the items are available at the physical facility in which the second computing system is disposed. Alternatively, the integration engine can present, via the graphical user interface provided by the second computing system, an option for delivery of the items at the address of the account holder which has been retrieved from the accounts database. The account holder can select to complete the transactions in the virtual shopping cart, can remove items from the virtual shopping cart and/or not take any action on the items in the virtual shopping cart.

In operation 410, the account holder can complete the transactions of items selected for purchase from the physical facility in which the second computing system is disposed by scanning the machine-readable elements associated with the items. In some embodiments, the integration engine can query the first physical objects database (e.g. first physical objects database 220 as shown in FIG. 2) and the second physical objects database (e.g. second physical objects database 225) using the identifiers of the scanned machine-readable elements to identify additional recommended items disposed at the physical facility, facilities at other locations and online sites. In some embodiments, the integration engine 230 can integrate the layaway management interface from the online site associated with the account holder's account into the second computing system's graphical user interface. The layaway management interface can include items the account holder has placed on layaway in the online account. The account holder can select to purchase layaway items at the second computing system, collect funds due on layaway items or remove items from the list of layaway items. The integration engine can determine which layaway items are disposed at the physical retail store, at different retail store locations and the virtual retail store.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An integration system comprising:
   a first computing system communicatively coupled to a first database and that is configured to store information associated with a plurality of accounts and a stored online session associated with at least one of the plurality of accounts;
   a second computing system disposed in a facility that includes a display and is communicatively coupled to a second database, wherein the second database is configured to store information associated with a plurality of physical objects disposed in the facility, the second computing system configured to:
      display on the display a graphical user interface that includes a first machine-readable element encoded with an identification of the second computing system; and
   a broker system communicatively coupled to the first computing system and the second computing system and configured to:
      establish communication with an application executing on a user's mobile device;
      receive from the application executing on the user's mobile device the identification of the second computing system and a first identifier, the first identifier identifying the user of the mobile device interacting with the second computing system, the identification of the second computer system obtained by the application executing on the mobile device reading and decoding the first machine-readable element;
      access, via the first computing system, information in the first database that is associated with the at least one of the plurality of accounts that is associated with the first identifier;
      retrieve, via the first computing system, information associated with the stored online session, the stored online session being associated with the at least one of the plurality of accounts;
      transmit a set of information from the retrieved information to the second computing system for integration into the graphical user interface being displayed by the second computing system;
      integrate into the graphical user interface being displayed by the second computing system, the set of information associated with the stored online session and another set of information associated with a current session executing on the second computing system; and
      receive, from the second computing system, an indication to proceed with purchasing products previously selected for purchase in the stored online session.

2. The system of claim 1, wherein the second computing system further comprises an optical reader and is further configured to:
   electronically read a second machine-readable element using the optical reader, and
   decode a second identifier from a second machine-readable element using the optical reader, wherein the second machine-readable element is associated with a first physical object disposed in the facility.

3. The system of claim 1, wherein the another set of information associated with the current session includes information associated with a second physical object.

4. The system of claim 3, wherein the broker system is further configured to:
   query the second database using the information associated with the second physical object and display the information associated with the second physical object on the display.

5. The system of claim 4, wherein the information associated with a second physical object includes an image.

6. The system of claim 5, wherein the broker system is further configured to:
   display the image of the second physical object on the graphical user interface of the display of the second computing system.

7. The system of claim 1, wherein the first and second computing systems are located in different geographic locations.

8. The system of claim 1, wherein the second computing system is further configured to:
   display a layaway option on the graphical user interface based on layaway information included in the retrieved information.

9. An integration method comprising:
   storing, via, a first computing system communicatively coupled with a first database that stores information associated with a plurality of accounts, an online session associated with at least one of the plurality of accounts;
   displaying, via a second computing system that includes a display and is communicatively coupled to a second database that stores information associated with a plurality of physical objects disposed in a facility, a graphical user interface on the display that includes a first machine-readable element encoded with an identification of the second computing system;
   establishing, at a broker system communicatively coupled to the first computing system and the second computing system, communication with an application executing on a user's mobile device;
   receiving, at the broker system, from the application executing on the user's mobile device the identification of the second computing system and a first identifier, the first identifier identifying the user of the mobile device interacting with the second computing system, the identification of the second computer system obtained by the application executing on the mobile device reading and decoding the first machine-readable element;
   accessing, at the broker system, via the first computing system, information in the first database that is associated with the at least one of the plurality of accounts that is associated with the first identifier;
   retrieving, at the broker system, via the first computing system information associated with the stored online session, the stored online session being associated with the at least one of the plurality of accounts;
   transmitting, from the broker system, a set of information from the retrieved information to the second computing system for integration into the graphical user interface being displayed by the second computing system;
   integrating into the graphical user interface being displayed by the second computing system, the set of information associated with the stored online session and another set of information associated with a current session executing on the second computing system; and receiving, at the broker system, from the second computing system an indication to proceed with purchasing products previously selected for purchase in the stored online session.

10. The method of claim 9, further comprising:

electronically reading, via the second computing system, a second machine-readable element using an optical reader associated with the second computing system; and decoding, via the second computing system, a second identifier from the second machine-readable element wherein the second machine-readable element is associated with a first physical object disposed in the facility.

11. The method of claim 9, wherein the another set of information associated with the current session includes information associated to a second physical object.

12. The method of claim 11, further comprising:

querying, via the broker system, the second database using the information associated with the second physical object; and displaying, via the broker system, the information associated with second physical object on the display of the second computing system.

13. The method of claim 12, wherein the information associated with a second physical object includes an image.

14. The method of claim 13, further comprising:

displaying, via the broker system, the image of the second physical object on the graphical user interface of the display of the second computing system.

15. The method of claim 9, wherein the first and second computing systems are located in different geographic locations.

16. The method of claim 9, further comprising:

displaying a layaway option on the graphical user interface based on layaway information included in the retrieved information.

17. A non-transitory computer readable memory medium storing instructions, wherein the instructions are executable by a processor to:

store, via, a first computing system communicatively coupled with a first database that stores information associated with a plurality of accounts, an online session associated with at least one of the plurality of accounts;

display, via a second computing system that includes a display and is communicatively coupled to a second database that stores information associated with a plurality of physical objects disposed in a facility, a graphical user interface on the display that includes a first machine-readable element encoded with an identification of the second computing system;

establish, at a broker system communicatively coupled to the first computing system and the second computing system, communication with an application executing on a user's mobile device;

receive, at the broker system, from the application executing on the user's mobile device the identification of the second computing system and a first identifier, the first identifier identifying the user of the mobile device interacting with the second computing system, the identification of the second computer system obtained by the application executing on the mobile device reading and decoding the first machine-readable element;

access, at the broker system, via the first computing system, information in the first database that is associated with the at least one of the plurality of accounts that is associated with the first identifier;

retrieve, at the broker system, via the first computing system information associated with the stored online session, the stored online session being associated with the at least one account;

transmit, from the broker system, a set of information from the retrieved information to the second computing system for integration into the graphical user interface being displayed by the second computing system integrate into the graphical user interface being displayed by the second computing system, the set of information associated with the stored online session and another set of information associated with a current session executing on the second computing system; and receive, at the broker system, from the second computing system an indication to proceed with purchasing products previously selected for purchase in the stored online session.

18. The non-transitory computer readable memory medium in claim 17, wherein the instructions are further executable by the processor to:

electronically read, via the second computing system, a second machine-readable element using an optical reader associated with the second computing system; and decode, via the second computing system, a second identifier from the second machine-readable element wherein the second machine-readable element is associated with a first physical object disposed in the facility.

19. The non-transitory computer readable memory medium in claim 17, wherein the another set of information associated with the current session includes information associated with a second physical object.

20. The non-transitory computer readable memory medium in claim 19, wherein the instructions are further executable by the processor to:

query, via the broker system, the second database using the information associated with the second physical object; and display, via the broker system, the information associated with second physical object on the display of the second computing system.

* * * * *